June 20, 1933.  W. D. SCHMIDT  1,915,005

CHUCK AND LOADING APPARATUS THEREFOR

Filed May 31, 1929   2 Sheets-Sheet 1

Inventor
William D Schmidt
By Geo. H. Kennedy Jr.
Attorney

June 20, 1933.  W. D. SCHMIDT  1,915,005
CHUCK AND LOADING APPARATUS THEREFOR
Filed May 31, 1929  2 Sheets-Sheet 2
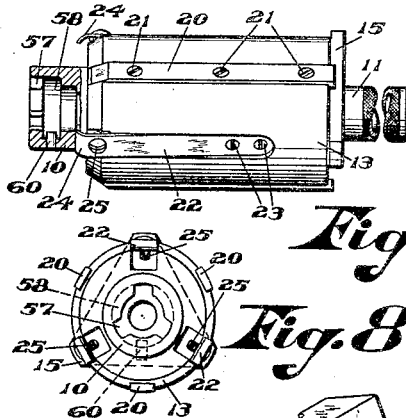
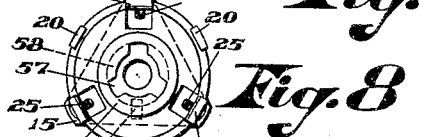
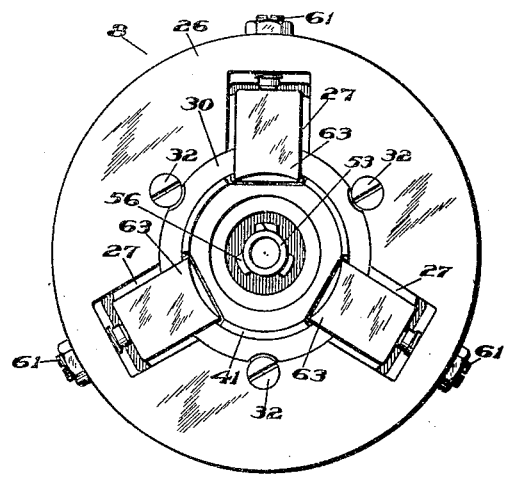
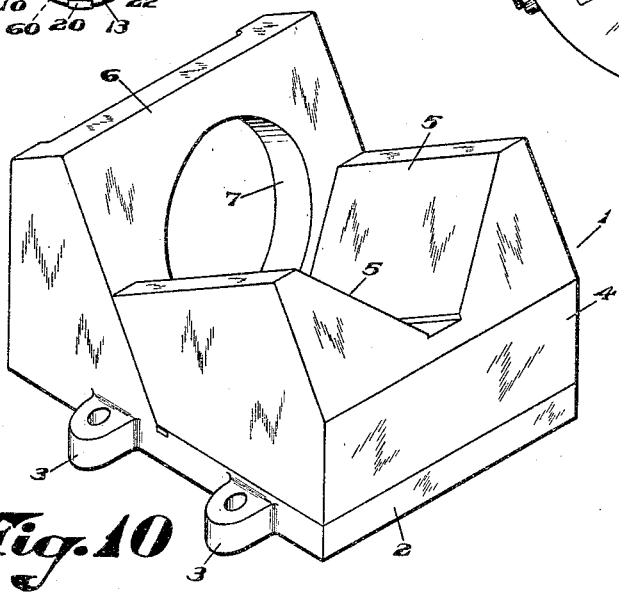
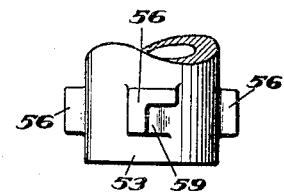
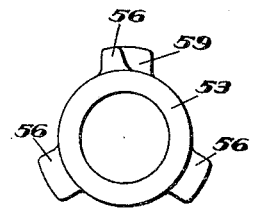
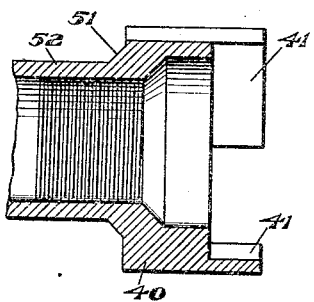
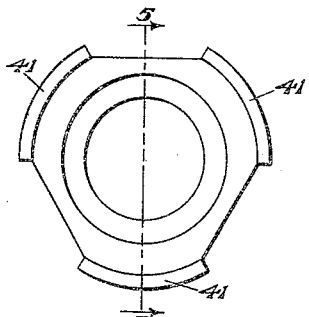
Inventor
William D. Schmidt
By Geo. H. Kennedy Jr.
Attorney Patented June 20, 1933

1,915,005

UNITED STATES PATENT OFFICE

WILLIAM D. SCHMIDT, OF WORCESTER, MASSACHUSETTS, ASSIGNOR TO THE HEALD MACHINE COMPANY, OF WORCESTER, MASSACHUSETTS, A CORPORATION OF MASSACHUSETTS

CHUCK AND LOADING APPARATUS THEREFOR

Application filed May 31, 1929. Serial No. 367,449.

The invention relates to chucks and loading apparatus therefor and particularly concerns apparatus for easily and quickly placing a great number of annular workpieces such as piston rings, in concentric relation in a single chuck.

In order to hold the several piston rings, whose internal surfaces are to be ground or otherwise machined, in concentric relation, the chuck of the present invention provides a hollow cylinder, and work clamping fingers to press the workpieces into engagement with an end wall or end flange provided by the cylinder. It will be apparent that it would be very difficult to manually load a chuck of this nature, since the clearance between the cylinder of the chuck and the piston rings must be very small indeed if the workpieces are to be truly centered, and since it would be difficult to push in the individual rings, without causing them to bind, owing to their narrowness.

One object of the invention therefore, resides in the provision of a loading or transferring member adapted to hold a great plurality of piston rings in alined position, permitting all of them to be driven into the cylindrical holding means of the chuck at once.

Even with the foregoing apparatus, it would be very difficult to manually push all these rings into the chuck, and consequently the invention further provides means operated by the draw rod of the chuck for pulling the transferring device into it. This is an important object of the invention, and involves the use of suitable connecting and disconnecting means, such as a bayonet lock or the like, to attach the transferring apparatus to the draw rod of the chuck and release it therefrom after the workpieces are clamped in position.

Since much difficulty would be experienced in manually loading the transferring device above mentioned, the invention further provides a device which may very easily be loaded by hand, and which is used to load the transferring device. Thus in its broad aspect, the invention provides primary and secondary loading apparatus to load a chuck, and this is one of the main objects of the invention.

Further objects of the invention will become apparent as the description proceeds.

In drawings:—

Fig. 3 is a front elevation of the chuck without the transferring device.

Fig. 4 is a front elevation of the work-ejector removed from the chuck.

Fig. 5 is a fragmentary sectional view of the work-ejector, taken on the line 5—5 of Fig. 4.

Fig. 6 is a front elevation of the bayonet lock to detachably hold the transferring device to the draw rod.

Fig. 7 is a fragmentary side elevation of the aforesaid bayonet lock.

Fig. 8 is a rear elevation of the transferring device.

Fig. 9 is a side elevation of the transferring device, with a portion thereof shown in section.

Fig. 10 is an isometric view of the primary work loader.

Like reference characters refer to like parts in the different figures.

Figure 2:
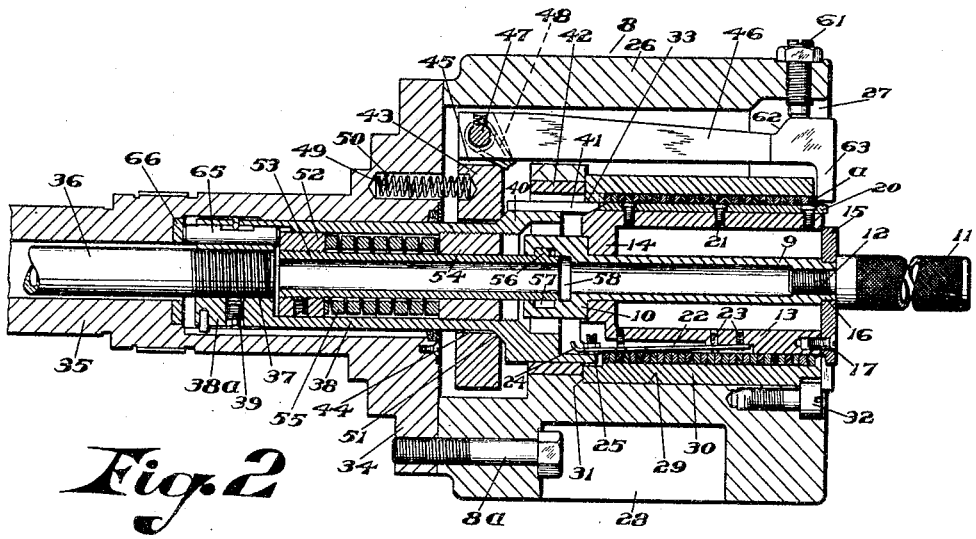
Fig. 2 is a view similar to Fig. 1, but showing the chuck gripping the workpieces and the transferring device in its innermost position in the chuck, just before it is released from the locking means that holds it to the draw rod.

Referring first to Fig. 10, the numeral 1 indicates a primary work loader into which a plurality of workpieces of the type adapted to be handled by the apparatus of this invention, for example, piston rings, may be readily loaded by hand without much waste of time or effort. The primary work loader 1 comprises a base portion 2 having lugs 3, 3 by means of which it may be fastened to a bench or other suitable place, said base portion supporting a member 4 having side portions 5, 5 forming a dihedral angle. Desirably the vertex of the dihedral angle (which in this case is an imaginary vertex as is apparent from the drawings) is inclined somewhat to the horizontal in order that the piston rings may be held in position by gravity. One end of the dihedral angle formed by the sides 5, 5 is closed by an end plate 6, which may be formed integral with base 2 as shown, and in which there is a large circular orifice 7 for a purpose which will become apparent.

The piston rings may be readily picked up in considerable quantities and placed with their peripheries tangent to the planes of the faces of the dihedral angle 5, 5 and there will rest one against another, the front ring resting against the end plate 6, since it is larger than the orifice 7. It is obvious that the axes of all the piston rings will be the same.

The secondary loading device, or the transferring device which is used to a transfer the piston rings from the primary loader 1 into the chuck 8 is illustrated in Figs. 1, 2, 8 and 9. Referring to these figures, a rod or tube 9 is provided having an enlarged portion 10 at one end for a purpose to be hereinafter described, and a handle 11 attached as by means of a screw threaded portion 12 to the other end. A hollow cylindrical member 13 is fastened to the rod 9, being held firmly in position by the engagement of a flange 14 formed at one end of said cylinder 13 with the shoulder formed by the end of the enlarged portion 10. At the other end, the rod and cylinder are not in engagement but are held in rigid relation by means of a triangular end plate 15 that provides a central hole fitting on a reduced portion 16 of the rod 9 and that is fastened as by means of screws 17 to the cylindrical member 13. As will be seen in Figs. 1 and 2, the front portion of the handle 11 forms a shoulder to firmly hold the plate 15 in place.

The exterior surface of the cylindrical member 13 provides a plurality of slots 18, 18, 18 of uniform depth, and a plurality of somewhat irregular slots 19, 19, 19, these several slots being arranged alternately. In the slots 18, 18, 18 are hardened steel bearing pieces 20, 20, 20 held in position by means of screws 21. In the slots 19, 19, 19 are flat springs 22, 22, 22 which are attached to the bottom of said slots as by means of a pair of screws 23 for each spring.

Figure 1:
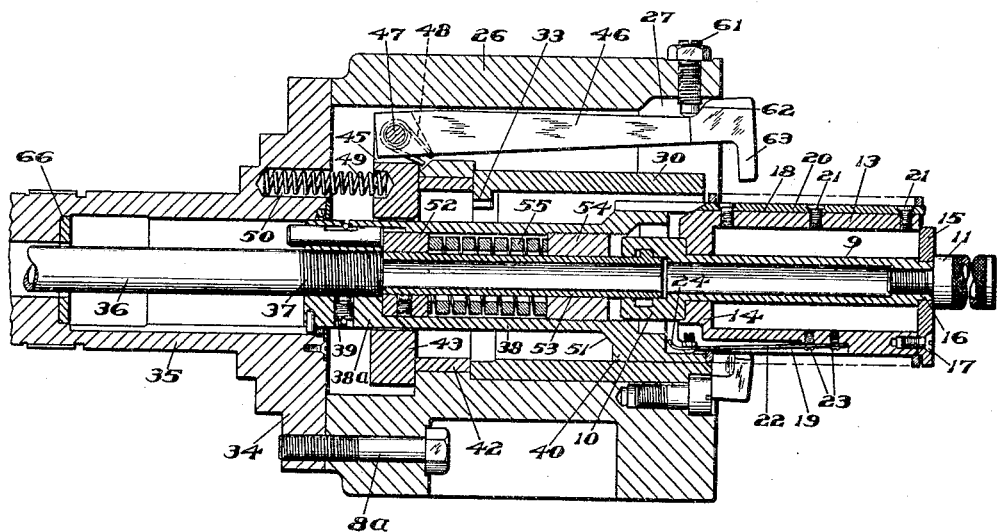
Fig. 1 is a sectional view of a chuck, showing the transferring device attached to the draw rod and about to be drawn into the chuck.

Referring to Figs. 1 and 2 desirably each spring normally tends to lie in a line which is inclined with respect to the axis of the cylinder 13, and with the left hand end of each spring further from the said axis than the right hand end thereof. The extreme left hand end of each spring is curved over, however, as shown at 24, while round headed studs 25 are provided on the ends of the spring for a purpose which will be hereinafter set forth.

It will now be apparent that the secondary loading or transferring apparatus can be held in one hand by means of its handle 11, and that, if it is of suitable diameter, it can be readily pushed into a stack of rings held in the loading device 1. The turned over ends 24 of the springs 22 will readily flex the springs inwardly, and permit the device to be pushed into the rings. Portions of the end plate 15 which extend beyond the ends of the cylinder 13 form an end stop to hold the first piston ring, while the thrust of the apparatus is taken by the back plate 6 of the device 1, the orifice 7 permitting the front end of the cylinder to pass therein if it is necessary to push the cylinder so far. The round headed studs 25 serve to flex the springs 22 inwardly as said studs pass into the piston rings, and consequently facilitate this operation. When the transferring apparatus is loaded with rings the flat springs 22 prevent them from falling off as they are transferred to the chuck 8.

Referring now to Figs. 1 and 2, the chuck 8 of the invention comprises a body portion 26 of generally hollow cylindrical form, having radial slots 27, 27 merging into its interior cylindrical surface and depressions 28 cut out of its exterior cylindrical surface, these irregularities of the cylinder being alternated so as not to interfere with each other. The interior cylindrical surface 29 between the slots 27 serves for the support of a hollow cylindrical sleeve 30, the inner end of which abuts against a shoulder 31 provided by the body of the chuck, the sleeve being held in place and forced against this shoulder by means of screws 32. Segmental end flanges 33 are provided at the inner end of the interior of the cylindrical sleeve 30 in order to form an end stop to support the workpieces. The internal diameter of the sleeve 30 is substantially equal to the external diameter of the workpieces $a$, as will be apparent, in order to maintain all of the workpieces, when positioned therein, in axial alinement by engagement with the peripheries of said workpieces.

The body of the chuck 8 is fastened by means of bolts 8a to a plate 34 which in this embodiment of the invention is shown as an integral part of the spindle 35 that supports the chuck, and which is rotatably mounted in a machine tool in any usual or desired manner. The spindle 35 is hollow and has slidably mounted in it a draw rod 36, such as is usually provided in chucks of this general type in order to operate the work clamping means thereof. To that end, the machine, not shown, provides a suitable lever or other operating means to move the draw rod to the right to release the work-holding members of the chuck, a powerful spring being employed to move the draw rod to the left to hold the work in clamped position. It is not deemed necessary to illustrate the spring and lever arrangement in the present drawings, because the present invention relates to the chuck and the loading apparatus therefor, and because the spring and lever operated draw rod is well known in the chuck art.

The front end of the draw rod 36 is screw threaded as shown at 37 and is screwed into one end of a generally tubular member 38 which serves the double purpose of a means for ejecting the ground workpieces, and a means for operating the work-holding fingers of the chuck from the spring pressure exerted by the draw rod. Once the proper position of adjustment has been obtained, the draw rod and member 38 are locked together as by means of a set screw 39.

The member 38 is hollow throughout the greater part of its length, and provides an enlarged portion 40 at the front end thereof. As shown in Figs. 4 and 5, this enlarged portion 40 provides integrally formed therewith a plurality, preferably three, of segmental forwardly projecting portions 41 which have a radius equal to the radius of the workpieces, and are so spaced and formed that they fit between the segmental end stop portions 33 of the cylindrical sleeve 30 that holds the workpieces. These segmental projecting portions 41 constitute an ejector to eject the workpieces out of the sleeve 30 when the parts are moved to the position shown in Fig. 1. The ejector segments 41, which are in effect a continuation of the draw rod 36, are supported in the chuck by the cylindrical sleeve 30 when they are in forward position shown in Fig. 1, while when they are in the position shown in Fig. 2, they are supported by a bearing ring 42 that is in turn supported by the body of the chuck.

The member 38 serves to slidably support a member 43 having a hole 44 therethrough and having a plurality of (desirably 3) pairs of ears 45 for the pivotal attachment to said member 43 of work clamping fingers 46. Pivot pins 47 pass through the ears 45 and also through holes in the ends of fingers 46 for the pivotal support of said fingers. The ends of the fingers 46 are themselves forked, and springs 48 fill the spaces between the forked portions thereof, one end of each spring pressing against the member 43 and the other end of said springs pressing against the fingers 46 and tending to spread them apart, away from the axis of the chuck. Coil springs 49, located in holes 50 formed in the plate 34, urge the member 43 and thus the fingers 46 forwardly.

With the parts in the position shown in Fig. 1, that is with the enlarged portion 40 of the sleeve 38 and the ejector portions 41 thereof at the front of the workpiece holding cylinder 30, there is nothing to hold the member 43 against the pressure of the springs 49, and consequently said member abuts the bearing ring 42 and the fingers 46 are in their foremost position. Rearward motion of the enlarged portion 40, however, brings an inclined annular shoulder 51 provided thereby into engagement with the member 43, and the pressure of the spring operating the draw bar 36 being much greater than the combined effect of all the springs 49, results in moving the member 43 to the left, to the position shown in Fig. 2. Before describing how this action clamps a workpiece, the mechanism for drawing the work transferring device into the chuck and for subsequently releasing it therefrom will now be described.

Inside the sleeve 38 is slidably mounted a collar 52 which is attached as by screw threaded engagement to a rod 53. Rod 53 passes through a stationary collar 54 that is in screw threaded engagement with the inside of the sleeve 38. Between the collars 52 and 54 is located a heavy coil spring 55. The front end of the rod 53, as shown in Figs. 6 and 7, is provided with a plurality of lugs 56.

The enlarged portion 10 of the transferrer device provides a plurality of slots 57 equal in number to the lugs 56, of the same width and depth, and spaced in the same angular relation to each other as the said lugs are spaced. Beyond the slots 57 is an annular groove 58. With the parts of the chuck in the position shown in Fig. 1, the portion 10 can readily be placed on the rod 53, the lugs 56 passing through the slots 57 into the annular portion 58, whereupon a slight turning of the transferrer member will result in locking the parts together. In order to prevent them from being turned too much, one of the lugs 56 provides a cut-out portion 59, the end of which is adapted to engage a pin 60 provided in the annular groove 58.

Assuming that the transferrer device has been attached to the rod 53 as just described, it is apparent that when the lever controlling the draw rod 36 is actuated to release the lever for rearward movement by the powerful spring referred to, the transferrer device with the workpieces loaded thereon will be drawn into the hollow cylindrical holder 30. The workpieces a are held in exact alined relation with the interior of the cylindrical 30 by reason of the fact that the ejector members 41 contact with said cylinder, which thus constitute a sliding support for the transferrer.

When the transferrer device with the workpieces a is drawn partly into the cylindrical member 30, the shoulder 51 of the enlarged portion 40 strikes the member 43, and further movement of the draw rod results in moving this member 43 to the left. This draws the fingers 46 to the left, and the fingers are at the same time moved radially inward by the engagement of adjustable screws 61 with cam surfaces 62 provided by said fingers, thus causing jaw pieces 63 to engage the front workpiece. The chuck parts are so constructed that the jaw piece has not moved down to the diametral position of the workpieces until the front workpiece has been moved inward beyond the engaging face of the jaws. Further movement of the parts results in causing the jaws 63 to firmly clamp the workpieces in position, as illustrated in Fig. 2.

The purpose of the interposition of the spring 55 between the rod and the draw rod 36 will now be made apparent. Before the jaws 63 have taken up all the slack between the workpieces, one or more pins 65 slidably mounted in the enlarged portion 38a of the sleeve 38 engage a shoulder or washer 66 provided by the spindle 35, and since the front ends of the pins 65 contact with the collars 52, further movement of said collars and therefore of the rod 53 is prevented. The sleeve 38 and the collar 54, however, which is attached thereto, continue to move to the left slightly, the motion of the collar resulting in compressing the spring 55. Since the jaws at this point contact with the workpieces a and push them to the left, this action relieves the end pressure between the transferrer device and the rod 53, and thus the transferrer may be turned to release the bayonet locking device consisting of the lugs 56 and the groove 58, and the transferrer may then be manually removed from the machine. The workpieces are now in loaded position in the chuck 8, ready to be operated upon by a tool.

When internal grinding of the workpieces a is completed or when any other operation has been performed thereon, they may be ejected from the chuck 8 by simply moving the draw rod 36 to the right. This results in moving the sleeve 38 to the right, forcing the ejector members 41 through the bore of the cylinder 30, which pushes the workpieces out of the chuck where they may be caught in a basket or any other suitable device.

I claim:

1. In a chuck, a hollow cylinder to hold a plurality of similar annular workpieces, said cylinder engaging the peripheries of said workpieces to maintain all of said workpieces in axial alinement within the chuck, means to clamp the workpieces in said cylinder, means to eject the workpieces from said cylinder, and a draw rod, said draw rod operating both the clamping means and the ejecting means.

2. In apparatus of the class described, a chuck, work-holding means in the chuck, a transferring device, a member in said chuck, and locking means to detachably connect the transferring device to the member in the chuck to draw the transferring device into said chuck to place workpieces carried by said transferring device in position for engagement by said work-holding means.

3. In apparatus of the class described, a chuck, a cylindrical member in said chuck adapted to hold a plurality of workpieces, a transferring device, a member in said chuck to actuate the same, and locking means to detachably connect the transferring device to the member.

4. In apparatus of the class described, a chuck, work-holding means in said chuck, a draw rod to actuate said work-holding means, a transferring device, and locking means to detachably connect the transferring device to the draw rod to place workpieces carried by said device in position for engagement by said work-holding means.

5. In apparatus of the class described, a chuck, a hollow cylindrical member in said chuck adapted to hold a plurality of workpieces, a draw rod to actuate said chuck, a transferring device, and locking means to detachably connect said draw rod to said transferring device.

6. In apparatus of the class described, a chuck, a hollow cylinder in said chuck to hold a plurality of said workpieces, an end stop at the end of said hollow cylinder, a draw rod to actuate said chuck, and locking means to detachably connect said draw rod to said transferring device to draw workpieces into said cylinder into engagement with said end stop.

7. In apparatus of the class described, a chuck, a draw rod to actuate said chuck, a transferring device, locking means to connect said draw rod detachably to said transferring device, whereby said transferring device may be drawn into said chuck, and means to relieve the end pressure on said locking means, whereby the transferrer may be removed.

8. In apparatus of the class described, a chuck, a draw rod to actuate said chuck, a transferring device, locking means to detachably connect said transferring device to said draw rod, means operated by said draw rod to clamp workpieces in position in said chuck, and means to relieve the end pressure on said locking means, due to the actuation of said draw rod when asid workpieces are clamped.

9. In apparatus of the class described, a chuck, a draw rod to operate said chuck, a transferring device, locking means to connect said transferring device detachably to said draw rod, a spring interposed between the locking means and the draw rod, and a stop to prevent motion of said locking means beyond a given position allowing the draw rod to compress the spring, whereby to relieve the pressure on the locking means to permit the transferring device to be removed.

10. In apparatus of the class described, a chuck, a draw rod to operate said chuck, a transferring device, locking means to connect said transferring device detachably to said draw rod, a plurality of work-holding fingers actuated by said draw rod, and a stop to prevent further motion of the locking means as the workpieces are clamped by the fingers, the draw rod at that time acting to compress a spring, whereby to relieve the tension on the locking means and allow the transferring device to be removed.

11. In apparatus of the class described, a chuck, a draw rod in said chuck, a transferring device comprising a generally cylindrical member for placing work-pieces within said chuck, jaws operated by said draw rod for engagement with the workpieces held by said transferring device, and an ejector operated by said draw rod to eject said workpieces from said chuck.

12. In apparatus of the class described, a chuck, a draw rod for said chuck, a member in said chuck, a plurality of work-holding fingers attached to said member, a transferring device adapted to be placed in said chuck between said fingers, whereby the latter may clamp workpieces held by the transferring device, and an ejector to eject the workpieces from the chuck.

13. In apparatus of the class described, a chuck, a hollow cylindrical member adapted to hold a plurality of annular workpieces in said chuck, a draw rod in said chuck, a plurality of work-holding fingers adapted to be drawn by said draw rod to over-lapping position at the front of said cylinder, a transferring device of generally cylindrical form to place workpieces in said cylinder, and an ejector to eject the workpieces from said cylinder.

14. In apparatus of the class described, a chuck, a hollow cylinder in said chuck adapted to hold a plurality of workpieces, a draw rod in said chuck, a plurality of work holding fingers adapted to clamp workpieces in said cylinder, a transferring device to load workpieces into said cylinder, and an ejector to eject the workpieces therefrom, said ejector being operated by said draw rod.

15. In apparatus of the class described, a chuck, a hollow cylinder in said chuck adapted to hold a plurality of workpieces, an end stop at the inner end of said cylinder, a draw rod in said chuck, a plurality of work-holding fingers adapted to clamp workpieces in said cylinder, a transferring device to load workpieces into said cylinder, and an ejector to eject the workpieces therefrom.

16. In apparatus of the class described, a chuck, a hollow cylinder in said chuck adapted to hold a plurality of workpieces, an end stop at the inner end of said cylinder, a draw rod in said chuck, a plurality of work-holding fingers adapted to clamp workpieces in said cylinder, a transferring device to load workpieces into said cylinder, and an ejector to eject the workpieces therefrom, said ejector being operated by said draw rod.

17. In apparatus of the class described, a chuck, a hollow cylinder adapted to hold a plurality of workpieces located in said chuck, a transferring device of generally cylindrical form to transfer workpieces to said hollow of cylinder, flat springs located in depressions in said transferrer to hold the workpieces thereon while being transferred, and work-holding fingers carried by said chuck adapted to over-lap the ends of the workpieces on said transferring device and strip them from it.

18. In apparatus of the class described, a chuck, a hollow cylinder adapted to hold a plurality of workpieces located in said chuck, a transferring device of generally cylindrical form to transfer workpieces to said hollow of cylinder, flat springs located in depressions in said transferring device to hold the workpieces thereon while being transferred, and work-holding fingers carried by said chuck adapted to over-lap the ends of the workpieces on said transferring device and strip them from it, and an ejector to eject the workpieces from the cylinder.

19. In apparatus of the class described, a chuck, a hollow cylinder adapted to hold a plurality of workpieces located in said chuck, a transferring device of generally cylindrical form to transfer workpieces to said hollow of cylinder, flat springs located in depressions in said transferring device to hold the workpieces thereon while being transferred, work-holding fingers carried by said chuck adapted to over-lap the ends of the workpieces on said transferring device and strip them from it, an end stop at one end of said cylinder to take the thrust of the work-holding fingers, and an ejector to eject the workpieces from said cylinder.

20. In apparatus of the class described, a chuck, a hollow cylindrical member in said chuck adapted to hold a plurality of workpieces, a draw rod in said chuck, a plurality of work-holding fingers adapted to over-lap the end of said cylinder and operated by said draw rod, an end stop at the inner end of said cylinder to hold said workpieces, a transferring device of generally cylindrical form to transfer the workpieces to said cylinder, flat springs in depressions in said transferring device to resiliently hold the workpieces while being transferred, and an ejector operated by said draw rod when said work-holding fingers are moved away from work clamping position, whereby to eject the workpieces from said cylinder.

21. In apparatus of the class described, a generally cylindrical transferrer adapted to impale a plurality of workpieces in alined position thereon, resilient means on said transferrer to hold said workpieces, a chuck, a hollow cylindrical member in said chuck for the reception of the transferrer with the workpieces mounted thereon and for maintaining the workpieces in alined position in said chuck upon removal of said transferrer from within said chuck, means for clamping the workpieces within the cylindrical member to strip said workpieces from the transferrer upon withdrawal of the latter from within the chuck, and an ejector in the chuck to eject the workpieces therefrom.

22. In apparatus of the class described, a generally cylindrical transferrer adapted to impale a plurality of workpieces in alined position thereon, resilient means on said transferrer to hold said workpieces releasably against movement thereon, a chuck, a hollow cylindrical member in said chuck to receive the transferrer with the workpieces mounted thereon and to maintain said workpieces in alined position in said chuck upon removal of said transferrer from said chuck, and means to clamp said workpieces within the cylindrical member to strip said workpieces from the transferrer upon withdrawal of the latter from within the chuck.

WILLIAM D. SCHMIDT.